United States Patent [19]

Pratt

[11] Patent Number: 5,554,586
[45] Date of Patent: Sep. 10, 1996

[54] POLYUREA THICKENER AND GREASE COMPOSITION

[75] Inventor: Samuel Pratt, Port Arthur, Tex.

[73] Assignee: Texaco Inc., White Plains, N.Y.

[21] Appl. No.: 395,215

[22] Filed: Feb. 27, 1995

[51] Int. Cl.⁶ .................................................. C10M 149/20
[52] U.S. Cl. .................................................. 508/552
[58] Field of Search ................. 252/51.5 A, 51.5 R; C10M 149/20

[56] References Cited

U.S. PATENT DOCUMENTS 3,870,642  3/1975  Gegner ................. 252/51.5 A
5,238,589  8/1993  Pratt et al. ............. 252/51.5 A

*Primary Examiner*—Prince Willis, Jr.
*Assistant Examiner*—Cephia D. Toomer
*Attorney, Agent, or Firm*—Kenneth R. Priem; Richard A. Morgan

[57] ABSTRACT

A grease composition with a high yield comprises a lubricating oil and a polyurea thickener prepared by reacting a diisocyanate compound with a monoamine and a low molecular weight polyoxyalkylene diamine.

10 Claims, No Drawings

POLYUREA THICKENER AND GREASE COMPOSITION

BACKGROUND OF THE INVENTION

1. Field of the Invention

The invention relates to a grease composition comprising a lubricating oil and a polyurea thickener and a process for its preparation. More specifically, the polyurea thickener is the reaction product of a diisocyanate, a monoamine and a low molecular weight polyoxyalkylene diamine.

2. Description of Related Information

Polyurea thickened grease compositions are used commercially to provide lubrication at high temperature for extended periods of time. The polyurea thickening agents are typically formed by reacting an isocyanate with an amine mixture in a base oil to yield the polyurea grease composition.

For example, U.S. Pat. No. 4,661,276 discloses a grease composition comprising a major amount of a lubricating oil base vehicle a polyurea gellant and a minor amount of a polymer having a pKa value of greater than 5.0.

U.S. Pat. No. 5,238,589 discloses a grease composition comprising a lubricating oil and a polyurea thickener prepared by reacting a diisocyanate compound with a monoamine, a diamine and a selected copolymer. The copolymer can be a polyoxyethylene/polyoxypropylene diamine copolymer with a molecular weight of 500 to 18,000.

U.S. Pat. No. 4,261,845 discloses a grease composition using polyureas prepared by reacting an alkylpolyalkoxy monoamine with an organic polyisocyanate.

U.S. Pat. No. 3,879,305 discloses a grease composition containing a thickening agent comprising a polyurea prepared by reacting a monoamine, a diisocyanate and a diamine having one amino group attached to each of two hydrocarbyl groups and the hydrocarbyl groups being separated by an oxygen or sulfur atom. The examples disclose greases having NLGI Grade No. 2 hardness at approx. 12% thickener levels.

I have discovered that by reacting a low molecular weight polyoxyalkylene diamine with a monoamine and a diisocyanate, a grease with an improved yield (low penetration number vs. high) is obtained when compared with greases thickened with other amine mixtures. A harder grease (NLGI Grade No. 3) is produced as opposed to a softer grease (NLGI Grade Nos. 2 or 1) which results when higher molecular weight polyoxyalkylene diamines or alkylene diamines are used.

The polyurea thickener of the present invention is a more effective thickener system than prior thickener. The polyurea thickener of the present invention allows the production of softer greases, i.e., NLGI Grades 1 and 2, more economically due to its superior thickening ability.

SUMMARY OF THE INVENTION

The invention provides a grease composition comprising a lubricating oil and a polyurea thickener, wherein the thickener is prepared by reacting a diisocyanate with a monoamine and a low molecular weight polyoxyalkylene diamine.

DESCRIPTION OF THE PREFERRED EMBODIMENTS

The polyurea thickener of the invention can be produced reacting a low molecular weight polyoxyalkylene diamine with a diisocyanate and a saturated primary monoamine.

The polyoxyalkylene diamine of the invention has a narrow molecular weight range of about 150 to about 300. Preferably the polyoxyalkylene diamine has a molecular weight between about 175 and about 275, and more preferably a molecular weight of about 230. Preferably the polyoxyalkylene diamine is a polyoxypropylene diamine of formula:

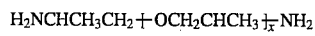

where x is an number between about 2 and about 3, preferably between 2 and 3, exclusive, and more preferably of about 2.6.

If polyoxyalkylene diamines of greater molecular weight are used, a softer grease is produced. The low molecular weight polyoxyalkylene diamine disclosed herein is required to generate the desired effect.

The polyoxyalkylene diamine is employed in an amount effective to improve the yield of the grease composition. In general, 0.1 parts by weight to 5.0 parts by weight of polyoxyalkylenediamine per hundred parts by weight of the finished grease represents the extremes of their content. A more preferable range of about 0.1 to 0.8 parts by weight of polyoxyalkylenediamine produces greases which show superior yields.

Representative examples of diisocyanates include hexanediisocyanate, decanediisocyanate, octadecanediisocyanate, phenylenediisocyanate, tolylenediisocyanate, bis(diphenylisocyanate), methylene bis(phenylisocyanate), etc.

The monoamine used in the formulation of the polyurea will form terminal end groups. These terminal end groups will have from 1 to 30 carbon atoms, but are preferably from 5 to 28 carbon atoms, and more desirably from 10 to 24 carbon atoms.

Illustrative of various monoamines are pentylamine, hexylamine, heptylamine, octylamine, decylamine, dodecylamine, tetradecylamine, hexadecylamine, octadecylamine, eicosylamine, dodecenylamine, hexadecenylamine, octadecenylamine, octadecadienylamine, abietylamine, aniline, toluidine, naphthylamine, cumylamine, bornylamine, fenchylamine, tertiary butyl aniline, benzylamine, B-phenethylamine, etc. Particularly preferred amines are prepared from natural fats and oils or fatty acids obtained therefrom. These starting materials can be reacted with ammonia to give first amides and then nitriles. The nitriles are then reduced to amines, conveniently by catalytic hydrogenation. Exemplary amines prepared by the method include stearylamine, laurylamine, palmitylamine, oleylamine, petroselinylamine, linoleylamine, linolenylamine, eleostearylamine, etc. The saturated amines are particularly preferred.

In a preferred method, the polyurea thickener of the invention can be formed by reacting the diisocyanate, the monoamine and the polyoxyalkylene diamine in a lubricating oil.

The reaction is carried out by mixing the reactants in a reaction vessel, at a temperature between about 60° F. and 320° F., preferably 100° F. to 300° F. for a period of from 0.5 hours to 5 hours, preferably 1 hour to 3 hours. The reaction vessel is typically a grease kettle, which may be operated as a batch reactor or as a continuous stirred tank reactor (CSTR).

The base oil forming the major component of the grease composition may be any oil having lubricating characteristics. Any conventionally refined base stocks derived from paraffinic, naphthenic and mixed mineral oil base crudes can be employed. In general, the naphthenic or paraffinic base oils or their blends will have Saybolt Universal viscosities in the range of from about 35 seconds to 300 seconds at 210° F. When a lubricating oil blend is employed in the grease making process, the oils may be blended as they are being used or they may be blended separately beforehand. The preferred mineral base oils are those having Saybolt Universal viscosities in the range of from about 67 seconds to about 87 seconds at 210° F.; they may be blends of lighter or heavier oils in the lubricating oil viscosity range.

This invention is shown by way of Examples.

COMPARATIVE EXAMPLE I

Into a suitable vessel were charged 20.4 lbs solvent neutral oil 850 and 2.4 lbs of a saturated octadecyl primary monoamine. After heating and mixing under a shear pressure of 100–110 psi, 1.2 lbs 4,4'-methylene bis(phenylisocyanate) was then added and the mixture thickened immediately. The resulting grease was heated with stirring for 1 hour at 300° F. 6.0 lbs solvent neutral oil 320 was added slowly to the grease. An NLGI Grade No. 1 grease with a worked penetration of 300 was generated.

COMPARATIVE EXAMPLE II

Into a suitable vessel were charged 20.4 lbs solvent neutral oil 850, 2.2 lbs of a saturated octadecyl primary monoamine and 0.1 lbs ethylenediamine. After heating and mixing under a shear pressure of 100–110 psi, 1.3 lbs 4,4'-methylene bis(phenylisocyanate) was then added and the mixture thickened immediately. The resulting grease was heated with stirring for 1 hour at 300° F. 6.0 lbs solvent neutral oil 320 was added slowly to the grease. An NLGI Grade No. 1 grease with worked penetration of 297 was generated.

INVENTION EXAMPLE III

Into a suitable vessel were charged 20.4 lbs solvent neutral oil 850, 2.1 lbs of a saturated octadecyl primary monoamine and 0.2 lbs of the preferred polyoxyalkylene diamine of the present invention, represented by the formula

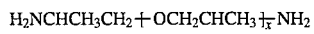

$$H_2NCHCH_3CH_2 + OCH_2CHCH_3 \overline{\phantom{x}} NH_2$$

where x is about 2.6. After heating and mixing under a shear pressure of 100–110 psi, 1.2 lbs 4,4'-methylene bis(phenylisocyanate) was then added and the mixture thickened immediately. The resulting grease was heated with stirring for 1 hour at 300° F. 6.0 lbs solvent neutral oil 320 was added slowly to the grease. An NLGI Grade No. 3 grease with a worked penetration of 220 was generated.

COMPARATIVE EXAMPLE IV

Into a suitable vessel were charged 20.4 lbs solvent neutral oil 850, 2.1 lbs of a saturated octadecyl primary monoamine and 0.2 lbs of a $C_{12}$ aliphatic diamine. After heating and mixing under a shear pressure of 100–110 psi, 1.2 lbs 4,4'-methylene bis(phenylisocyanate) was then added and the mixture thickened immediately. The resulting grease was heated with stirring for 1 hour at 300° F. 6.0 lbs solvent neutral oil 320 was added slowly to the grease. An NLGI Grade No. 1 grease with a worked penetration of 315 was generated.

COMPARATIVE EXAMPLE V

Into a suitable vessel were charged 20.4 lbs solvent neutral oil 850, 2.0 lbs of a saturated octadecyl primary monoamine and 0.4 lbs of a polyoxyalkylene diamine represented by the formula

$$H_2NCHCH_3CH_2 + OCH_2CHCH_3 \overline{\phantom{x}} NH_2$$

where x is about 5.6. After heating and mixing under a shear pressure of 100–110 psi, 1.2 lbs 4,4'-methylene bis(phenylisocyanate) was then added and the mixture thickened immediately. The resulting grease was heated with stirring for 1 hour at 300° F. 6.0 lbs solvent neutral oil 320 was added slowly to the grease. An NLGI Grade No. 2 grease with a worked penetration of 260 was generated.

EXAMPLES I–V

Grease compositions were formed as described above. Each had the following compositions and properties:

TABLE I

|  | Comp. Ex. I | Comp. Ex. II | Invent. Ex. III | Comp. Ex. IV | Comp. Ex. V |
|---|---|---|---|---|---|
| Components: Weight % | | | | | |
| SNO 320 | 19.89 | 19.89 | 19.89 | 19.89 | 19.89 |
| SNO 850 | 68.11 | 68.11 | 68.11 | 68.11 | 68.11 |
| $C_{18}$ monoamine | 7.89 | 7.44 | 7.11 | 7.03 | 6.80 |
| 4,4'-methylene bis(phenylisocyanate) | 4.11 | 4.36 | 4.16 | 4.12 | 3.98 |
| Ethylenediamine | — | 0.20 | — | — | — |
| polyoxyalkylene diamine, mol. wt. about 230 | — | — | 0.73 | — | — |
| $C_{12}$ aliphatic diamine | — | — | — | 0.85 | — |
| polyoxyalkylene diamine, mol. wt. about 400 | — | — | — | — | 1.22 |
| INSPECTIONS: Penetration | | | | | |
| Unworked | 265 | 243 | 205 | 290 | 243 |
| Worked 60 | 300 | 297 | 220 | 315 | 260 |

Each of the grease compositions of Examples I–V contains 12 wt % of a thickener system. Examples I, II, IV and V are comparative examples, and Example III is an example of the thickener system of the invention.

The thickener system of Comparative Example I is the reaction product of a $C_{18}$ monoamine and 4,4'-methylene bis(phenylisocyanate). There is no diamine reacted. Comparative Example 1 produces a grease of NLGI Grade No. 1.

The thickener system of Comparative Example II adds ethylene diamine to the system of Comparative Example I (no diamine), and the worked penetration results are virtually identical to those obtained without any diamine, i.e., 297:300. Both are NLGI Grade No. 1 greases.

The thickener system of Example III is a thickener system of the invention. In this example the ethylene diamine of Comparative Example II was replaced with a molar equivalent amount of a polyoxyalkylene diamine of the invention. The worked penetration results dropped to 220, providing a much harder NLGI Grade No. 3 grease.

The thickener system of Comparative Example IV utilizes a molar equivalent amount of $C_{12}$ aliphatic diamine with a molecular weight of about 270. This formulation actually results in decreased performance as compared to Comparative Example I (no diamine), providing an NLGI Grade No. 1 grease with a penetration of 315.

Finally, Comparative Example V replaces the polyoxyalkylene diamine of Example III with a molar equivalent of a heavier polyoxyalkylene diamine, i.e., a 400 molecular weight v. a 230 molecular weight. Use of the heavier polyoxyalkylene diamine resulted in a worked penetration of 260, providing an NLGI Grade No. 2 grease. When this is compared to the worked penetration of the grease made with the polyoxyalkylene diamine of the invention, which provided an NLGI Grade No. 3 grease with a worked penetration of 220, it is clear that low molecular weight is critical to the performance of the polyurea thickener of the invention.

TABLE II

Penetration Test Method: ASTM D-217

NLGI Grease Classification

| Grade No. 1 | 310 to 340 Penetration |
| Grade No. 2 | 265 to 295 Penetration |
| Grade No. 3 | 220 to 250 Penetration |

While particular embodiments of the invention have been described, it will be understood, of course, that the invention is not limited thereto since many modifications may be made, and it is, therefore, contemplated to cover by the appended claims any such modification as fall within the true spirit and scope of the invention.

I claim:

1. A grease composition comprising a lubricating oil and a thickener, characterized in that the thickener is a polyurea compound prepared by reacting a diisocyanate compound with a monoamine and a polyoxypropylene diamine having a molecular weight of about 150 to about 300.

2. The grease composition of claim 1 wherein the polyoxypropylene diamine has a molecular weight between about 175 and about 275.

3. The grease composition of claim 1 wherein the polyoxypropylene diamine has a molecular weight of about 230.

4. The grease composition of claim 6 wherein 100 parts by weight of the grease composition comprises 0.1 to 5.0 parts by weight of the polyoxypropylene diamine.

5. The grease composition of claim 1 wherein 100 parts by weight of the grease composition comprises 0.1 to 0.8 parts by weight of the polyoxypropylene diamine.

6. A grease composition comprising a lubricating oil and a thickener, characterized in that the thickener is a polyurea compound prepared by reacting 4,4'-methylene bis(phenylisocyanate) with a $C_{18}$ aliphatic primary monoamine and a polyoxypropylene diamine having a molecular weight of about 150 to about 300.

7. The grease composition of claim 6 where the polyoxypropylene diamine has a molecular weight of about 175 to about 300.

8. The grease composition of claim 6 where the polyoxypropylene diamine has a molecular weight of about 230.

9. The grease composition of claim 6 wherein 100 parts by weight of the grease composition comprises 0.1 to 5.0 parts by weight of the polyoxypropylene diamine.

10. The grease composition of claim 11 wherein 100 parts by weight of the grease composition comprises 0.1 to 0.8 parts by weight of the polyoxypropylene diamine.

* * * * *